United States Patent [19]

Mumaw

[11] Patent Number: 4,539,290
[45] Date of Patent: Sep. 3, 1985

[54] PROCESS FOR PULSED FLOW, BALANCED DOUBLE JET PRECIPITATION

[75] Inventor: Clayton T. Mumaw, Wilmington, Del.

[73] Assignee: E. I. Du Pont de Nemours and Company, Wilmington, Del.

[21] Appl. No.: 536,410

[22] Filed: Sep. 27, 1983

[51] Int. Cl.³ .............................................. G03C 1/02
[52] U.S. Cl. ..................................... 430/569; 430/567
[58] Field of Search ................................ 430/567, 569

[56] References Cited

U.S. PATENT DOCUMENTS

| 3,415,650 | 12/1968 | Frame et al. | 96/94 |
| 3,790,386 | 2/1974 | Posse et al. | 96/94 R |
| 3,917,485 | 11/1975 | Morgan | 96/101 |
| 4,242,445 | 12/1980 | Saito | 430/569 |
| 4,251,627 | 2/1981 | Calamur | 430/569 |
| 4,335,199 | 6/1982 | Mickewich et al. | 430/567 |

FOREIGN PATENT DOCUMENTS 1243356 8/1971 United Kingdom .
1441612 7/1976 United Kingdom .

Primary Examiner—Mary F. Downey

[57] ABSTRACT

A pulsed flow, balanced double jet precipitation process is disclosed in which a silver salt solution and a halide salt solution are each separately introduced into and diluted by a gelatin solution disposed in both a primary and secondary mixing zone defined within a reaction vessel. The pulses of a predetermined volume of the silver salt solution and the halide salt solution are alternately introduced at substantially the same point in the primary mixing zone with a predetermined pause between each pulse.

8 Claims, 4 Drawing Figures

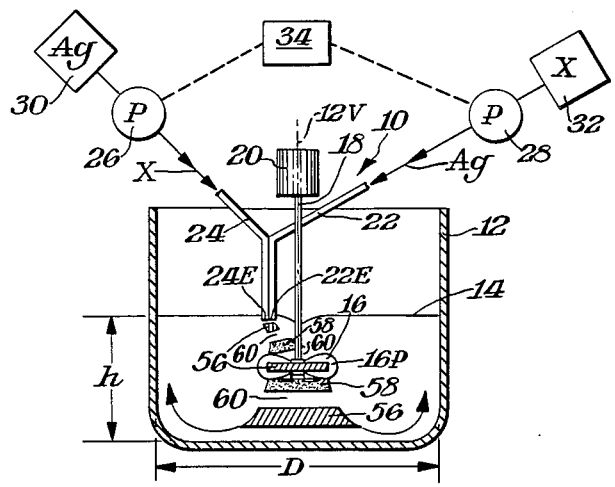

PROCESS FOR PULSED FLOW, BALANCED DOUBLE JET PRECIPITATION

BACKGROUND OF THE INVENTION

This invention relates to a process for the preparation of photographic emulsion and, in particular, to a process for precipitating silver halide particles using a pulsed flow, balanced double jet precipitation technique.

The preparation of silver halide emulsion used in the manufacture of photosensitive film must be carried out under carefully controlled conditions. Typical of the factors which must be controlled are the rate of addition of reactants, the silver ion concentration (pAg), the hydrogen ion concentration (pH), the halide salt concentration, the relative mixing uniformity of reactants added from two separate silver and halide sources, the temperature at which silver halide precipitation is to occur and the duration of the precipitation.

It is known that in the preparation of monodisperse narrow particle size silver halide emulsions by balanced double jet precipitation rapid dilution of the reactants in a reaction vessel plays an important role in determining the final mean particle volume and particle size distribution. Prior art apparatuses and processes usually employ a high speed agitator disposed in the reaction vessel to mix the reactants. In some cases, a dispersing mechanism of the type shown in U.S. Pat. No. 3,415,650 (Frame & Johnson) is used to effect rapid dispersion of the reactants and to control the halide or silver ion concentration in the reaction vessel. U.S. Pat. No. 4,251,627 (Calamur) discloses an apparatus and a process for preparing a photographic silver halide emulsion having a controlled particle size, structure and size distribution; a silver salt and an alkali metal halide react to precipitate silver halide grains at uniform silver ion concentration (pAg). High velocity mixing jets are used, directed vertically downwardly to accomplish rapid dilution and mixing of reactants in a paddle-agitated reaction vessel. The arrangement there shown employs either a single recycled or a double recycled loop to provide additional dilution control and to feed a mixing jet.

In U.S. Pat. No. 3,917,485 (Morgan) a process for making internally sensitive photographic emulsion is disclosed. This process is applicable to convert a variety of surface sensitive or surface fogged silver halide emulsions including poly-dispersed emulsions of varied particle size into internally sensitive photographic silver halide emulsions by, for example, adding additional quantities of the silver and halide salts alternately so that the excess of ion above the stoichiometrically required amount is successively shifted between the silver and halide ions present.

None of the above-described apparatuses or processes is believed able to provide the necessary control over the dilution within the reaction vessel of the silver salt and the halide salt solutions especially when highly concentrated reactant streams are used. In addition, none appears to provide control over the proper mixing of these reactants, especially at the initial mixing point. Such control is believed to be desirable for controlled precipitation and growth of silver halide crystals. It is therefore believed advantageous to provide a process for the double jet precipitation of silver halide particles which includes accurate control of the dilution and mixing of the reagents. Such accurate control should eliminate fluctuations and run-to-run mixing variations which affect the silver halide particle size, and should thereby increase yields and reduce the need for blending of various batches to obtain the necessary particle size distribution. This is especially true when it is desired to operate at low silver ion concentration (high pAg) conditions in the precipitation vessel where re-seeding is a problem or where high precipitation rates are desired. As a corollary, it is believed advantageous to provide a process for the production of silver halide crystals which reduces the need to use ammonia as a growth regulator. More particularly, in cases where ammonia has heretofore been used to produce larger grains than obtained without ammonia, it would be desirable to eliminate the ammonia, since it is hard to control the growth due to the activity of the ammonia. Additionally, the incorporation of dopants during double jet precipitation is related to the growth rate of individual crystals. Therefore, a process which allows the more uniform growth rate of individual crystals would allow the more uniform incorporation of dopants.

SUMMARY OF THE INVENTION

The present invention relates generally to a process for double jet precipitation of silver halide particles in which solutions of a concentrated silver salt and a concentrated halide salt are each separately introduced into and diluted by a gelatin solution disposed in both a primary and a secondary mixing zone defined within a reaction vessel having a predetermined volume of a gelatin solution therein by a rotating mixing element. The gelatin solution is initially devoid of silver halide particles. The axis of rotation of the mixing element is coincident with the central axis of the reaction vessel. The invention generally resides in the temporally spaced introduction of alternate pulses having predetermined volumes of the solutions of the silver and the halide salts into substantially the same point in the vessel, the point being spaced from the mixing element and located substantially along its axis of rotation in the primary mixing zone. More particularly, the process according to the present invention comprises the steps of: (a) introducing a first pulse having a predetermined volume of one of the silver salt or the halide salt solution into the gelatin solution at the predetermined point; (b) pausing a first predetermined time interval to allow the first salt solution to enter a predetermined distance into the gelatin solution whereby it achieves a predetermined dilution; (c) thereafter introducing a second pulse having a predetermined volume of the other of the salt solutions into the gelatin solution at substantially the same predetermined point; (d) pausing for a second predetermined time interval to allow the second salt solution to enter a second predetermined distance into the gelatin solution whereby it achieves a predetermined dilution; and (e) repeating steps (a) through (d). In a more particular embodiment the process of the present invention may further include the additional step of (f) simultaneously drawing into the primary mixing zone the reaction product of the silver and the halide salt solutions from the secondary mixing zone defined in the vessel outside of the primary mixing zone.

BRIEF DESCRIPTION OF THE DRAWING

The invention may be more fully understood from the following detailed description thereof taken into connection with the accompanying drawings which form a part of this application and in which.

DETAILED DESCRIPTION OF THE INVENTION

Figure 1:
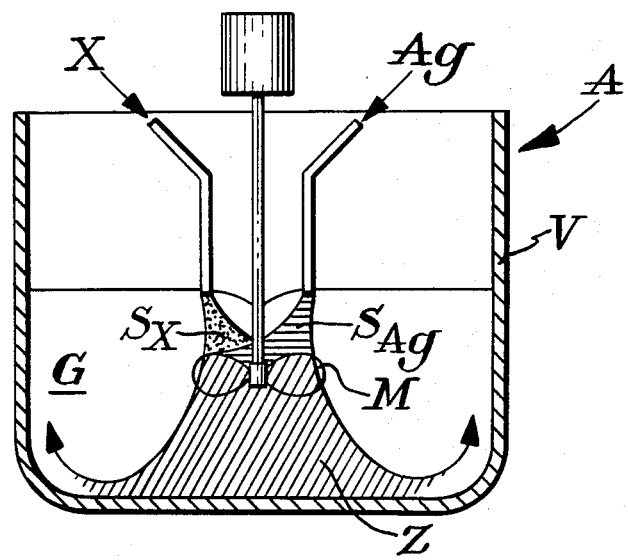
FIG. 1 is a highly stylized schematic representation of a continuous balanced double jet precipitation apparatus of the prior art.

Throughout the following detailed description similar reference numerals refer to similar elements in all figures of the drawings.

With a reference to FIG. 1, shown is highly stylized schematic representation of a continuous balanced double jet precipitation apparatus in accordance with the prior art. The apparatus A includes a vessel V which receives a mixing element M in the form of a propeller. Two conduits X and Ag respectively terminate at any convenient spaced locations within the vessel V. The vessel V is filled to a predetermined level with a volume of gelatin solution G. In accordance with the prior practice a metal halide salt solution and a silver salt solution are directed in continuous streams by the respective conduits X and Ag into the gelatin G. The silver salt solution is indicated by hatching while the halide salt solution is stippled for clarity of illustration. Rotation of the mixing element M serves to vigorously mix the two solutions in a mixing zone Z. Silver halide particles are produced as the silver salt solution engages and reacts with the halide salt solution. The size and distribution of silver halide particles depends on the concentration of the two streams at the point where they happen to engage and react with each other within the gelatin solution.

Figure 2:
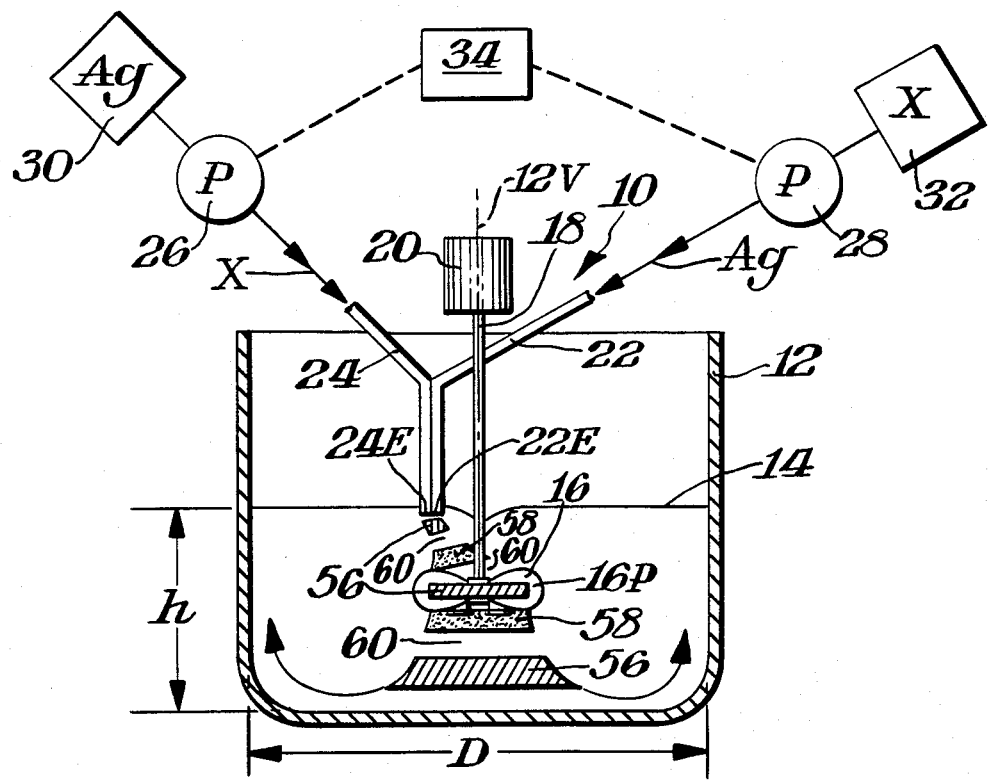
FIG. 2 is a stylized pictorial representation of an apparatus for practicing a pulsed flow, balanced double jet precipitation process in accordance with the teachings of the present invention.

Referring now to FIG. 2 shown is a stylized pictorial representation of the pulsed flow, balanced double jet precipitation apparatus for practicing the process in accordance with the present invention. The apparatus generally indicated by reference character 10 includes a reaction vessel 12 similar to the vessel V used in the prior art. The reaction vessel 12 is usually fabricated of stainless steel, glass or another inert material. The vessel 12 has a central axis 12V extending therethrough. The vessel 12 has a diameter D and is filled to a height h to hold a predetermined volume 14 of a gelatin solution in which the silver halide particles are formed. The ratio D/h should not exceed 3.0, and is preferably in the range from 1.3 to 2.5. A mixing element generally indicated by reference character 16 includes a propeller element 16P supported into the vessel on a shaft 18. The axis of rotation of the mixing element is preferably coincident with the central axis 12V of the vessel. As best seen in FIG. 4, each blade of the mixing element 16 in the preferred embodiment includes a downwardly depending tab 16T which define supplemental agitators provided for a purpose more fully discussed herein. The shaft 18 is connected to a suitable source of motive energy 20. In accordance with this invention, a silver salt solution conduit 22 and a halide salt solution conduit 24 are supported by a suitable support arrangement (discussed in more detail in conjunction with FIGS. 3 and 4) within the reaction vessel 12. The ends 22E and 24E of the respective conduits 22 and 24 are arranged so that the silver salt and the halide salt solutions are introduced into the gelatin solution 14 at substantially the same point within the volume of the gelatin solution within the vessel 12. As discussed herein, the predetermined point of entry of the salt solutions into the gelatin solution lies within a primary mixing zone along the axis of rotation of the mixing element. The opposite ends of the conduits 22 and 24 are respectively connected through associated pumps 26 and 28 (such as solenoid metering pumps) to sources of silver salt solution 30 and halide salt solution 32. The pumps 26 and 28 are controlled by a suitable control network 34. The control network 34 is adapted to operate each of the pumps 26 and 28 for a predetermined time interval in accordance with a predetermined time sequence whereby temporally separated pulses of silver salt solution and halide salt solution are introduced into the vessel 12 for a purpose discussed in more detail herein.

Figure 3:
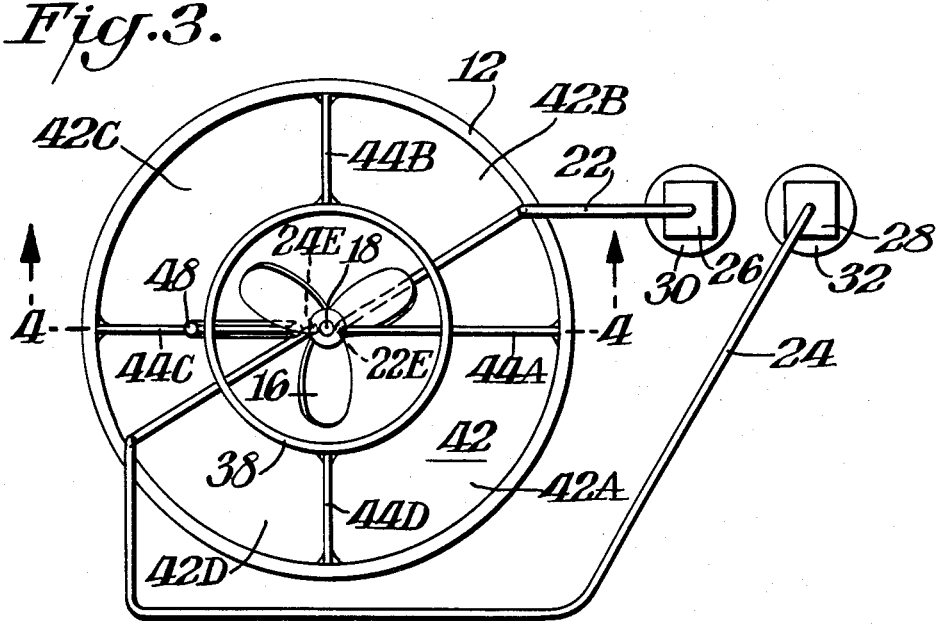
FIG. 3 is a plan view of the preferred embodiment of an apparatus for practicing pulsed flow, balanced double jet precipitation process in accordance with the teachings of the present invention.
Figure 4:
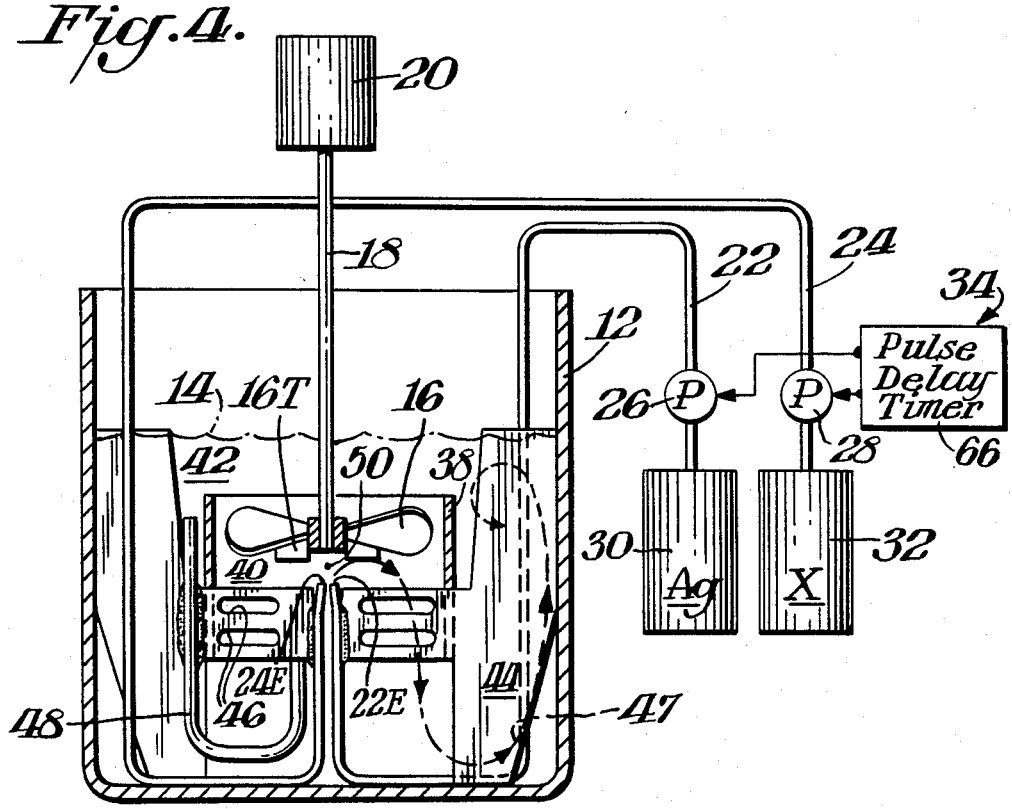
FIG. 4 is a side elevational view entirely in section taken along section lines 4—4 in FIG. 3.

As shown in FIG. 3, in accordance with the preferred embodiment of the invention, a draft tube 38 is disposed on the interior of the vessel 12 in a concentric relationship with respect to the shaft 18 of the mixing element 16. Thus, the draft tube 38 serves to define a primary mixing zone 40 (FIG. 4) on the interior of the reaction vessel 12. Although preferably present, if the draft tube 38 is omitted, that region of the vessel 12 generally beneath the mixing element 16 defines the primary mixing zone 40. That annular region defined by the draft tube 38 within the reaction vessel 12 outside of the primary mixing zone 40 is defined as a secondary mixing zone 42.

A plurality of baffles 44A through 44D (FIG. 3) is arranged on the interior of the vessel 12. The baffles project radially inwardly of the draft collar 38 and meet substantially along the axial center line of the reaction vessel 12. The portion of each baffle within the draft tube 38 is provided with slots 46 (FIG. 4) which facilitate fluid communication between all regions of the primary mixing zone 40. The portions of the baffles 44 in the primary mixing zone 40 serve as dams which break the continuous rotation of the solution within the vessel 12 as the mixing element 16 turns. The radial portions of the baffles 44 extending outside of the draft collar 38 subdivide the secondary mixing zone 42 into a plurality of regions 42A through 42D.

The ends 22E and 24E of the conduits 22 and 24, respectively, terminate within the primary mixing zone 40 of the vessel 12 and are arranged to direct the silver salt and the halide salt solutions toward substantially the same predetermined point 50 lying beneath the mixing element 16. The shaft 18 of the mixing element 16 is situated within the reaction vessel 12 so as to be coincident with the axial center line 12V thereof. Accordingly, the ends 22E and 24E of the conduits 22 and 24, respectively, and the point 50 lie also along the axial center line of the reaction vessel 12.

In accordance with the preferred embodiment of the invention, the conduits 22 and 24 are mounted to the baffles 44 which thereby serve to define a support arrangement for supporting the conduits 22, 24 within the reaction vessel 12 such that the ends 22E, 24E of the conduits are arranged to direct a predetermined volume of the silver and halide salt solutions toward substantially the same predetermined point 50 in the primary mixing zone 40. It should be understood that any support arrangement which so arranges the ends of the conducts 22, 24 is equivalent to the support arrangement utilized in the preferred embodiment of the apparatus of the present invention.

One or more recirculating tubes 48 are mounted in a convenient location within the reaction vessel 12, preferably to the draft collar 38. The recirculating tube (tubes) 48 serve to communicate respective regions of the secondary mixing zone 42 with the primary mixing zone 40 for purposes to be discussed herein.

The pulsed flow, balanced double jet precipitation apparatus and process in accordance with the present invention is based upon the recognition that the silver and the halide salt solutions need not be delivered into the reaction vessel 12 as a continuous stream but may instead be delivered in an intermittent, pulsed fashion.

In the prior art, as shown in FIG. 1, the silver salt solution and the halide salt solution are introduced into the gelatin solution G in continuous streams $S_{AG}$ and $S_X$. These streams mix together in the ill-defined mixing zone Z within the vessel V. In such an arrangement, the concentration of the two reactants at any point within the mixing zone Z is basically uncontrolled because of the presence of irregularly flowing eddies which are the result of the turbulence created by the propeller, and which randomly vary the distribution within the vessel, and therefore, the concentration of each reactant. Thus, severe concentration gradients will be found simultaneously for the two reactants anywhere within the vessel V.

In accordance with the present invention, as shown schematically in FIG. 2, the intermittent pulsed delivery of the silver and halide salt solution streams results in the formation of pulses 56 of silver salt solution and pulses 58 of halide salt solution separated by spaces 60. In FIG. 2 the pulses 56 of silver salt solution are shown as cross-hatched while the pulses 58 of halide salt solution are stippled. By allowing a certain time to elapse after each pulse of reactant enters the vessel, more uniform distribution of each reactant is possible. The alternately introduced pulses of silver and halide salt solutions follow the same general mixing pattern as used in the prior art but permit the rapid mixing and dilution into the gelatin solution of each individual pulse so that silver halide precipitation occurs as if lower concentrations of the silver and halide salt solutions were used.

This principle discussed in connection with FIG. 2 is most preferably implemented by the structure shown in FIG. 3. In this instance, the pulses 56 of silver salt solution and the pulses 58 of halide salt solution are delivered into the primary mixing zone 40 at the point 50 along the axial center line of the vessel 12 just beneath the mixing element 16. The pulses are delivered in alternate fashion, with a first and a second predetermined time interval between each pulse. Depending on the particular grains to be precipitated, the time intervals between each pulse and/or the duration of each pulse of each solution may be equal, may remain constant throughout the addition process, or may vary with time as the addition process progresses. As a result of the pulsed delivery of the reactant salt solutions within the confines of the draft tube 38 (that is, in the primary mixing zone 40), as each pulse of reactive salt solution is introduced into the primary mixing zone 40 it follows a predetermined course through the primary mixing zone and out into the secondary mixing zone becoming diluted as shown by the arrows 47 in FIG. 4. On a macroscopic scale the injected pulse has achieved maximum dilution with the zone 42. The next occurring delivery of a pulse of the other of the reactant solution may be timed to occur when a predetermined dilution of the first reactant solution within the mixing zones has been reached. Thus, in accordance with the present invention, by controlling the duration of each pulse of reactant salt solution as well as the time interval between the alternate delivery of each pulse of solution a substantial amount of control of the dilution of the reactants within the primary and secondary mixing zones may be achieved. This leads to more predictable crystal growth patterns.

The presence of the supplemental agitator or tab 16T on each of blades of the propeller 16 eliminates the usual stagnant region that appears under the hub of a mixing element in prior art.

To better control the dilution within the primary mixing zone 40, the recirculating tubes 48 may be employed to draw gelatin solution (which may, as the process continues, contain some of the reaction product silver halide crystals) from the secondary mixing zone 42 into the primary mixing zone 40. Thus the presence of tubes 48 assures a supply of fluid from the zone 42 into the zone 40 and simultaneously forces the injected pulses of reactant to follow a path which leads them from the zone 40 into the zone 42. In the absence of the recirculating tubes, secondary eddies of reactants may form within the zone 40, trapping the reactants in that zone.

The controller 34 includes a pulse delay timer 66 which is arranged to operate the respective pumps 26 and 28 to produce any predetermined sequence of pulses. As noted, preferably the salt solutions are alternately introduced into the vessel 12. The controller 34 also controls the time duration of each of the pulses of reactant solution as they are introduced alternatively into the primary mixing zone 40. Preferably, but not necessarily, there may be pauses of predetermined duration between each pulse. As typical examples, silver salt solution pulses and halide salt solution pulses are each two seconds in duration. Pauses of one second between alternate silver and halide salt solution pulses have been used. The particular cycle, including the duration of each pulse of each reactant and the length of each pause between alternate pulses will be determined by the concentration of the reactants, the type of crystal grains desired to be precipitated, the flow rates of the reactants and the volume of the gelatin solution. Moreover, any suitable timing arrangement operative to effect the desired cycle (salt solution introduction, pause, other salt solution introduction, and pause) may be used and remain within the contemplation of the present invention. In addition, it should be appreciated that the hydrogen ion concentration (pH), the silver ion concentration (pAg), the halide salt concentration, and the temperature can be varied during the course of precipitation in accordance with any established procedures known to those with skill in the art.

Those skilled in the art having benefit of the teaching of the invention as hereinabove set may effect numerous modifications thereto. These modifications are to be construed as lying within the scope of the present invention as defined in the appended claims.

What is claimed is:

1. In a process for double jet precipitation of silver halide particles in which a silver salt solution and a halide salt solution are each separately introduced into and diluted by a gelatin solution disposed in both a primary and a secondary mixing zone defined within a reaction vessel by a rotating mixing element, the gelatin solution being initially devoid of silver halide particles, the axis of rotation of the mixing element being coincident with the central axis of the reaction vessel, comprising the steps of:

(a) introducing a predetermined volume of one of the silver salt solution or the halide salt solution into the gelatin solution at a predetermined point spaced from the mixing member and substantially along its axis of rotation in the primary mixing zone;

(b) pausing a first predetermined time interval to allow the first salt solution to enter a predetermined distance into the gelatin solution;

(c) thereafter introducing a predetermined volume of the other of the salt solutions into the gelatin solution at substantially the same predetermined point in the primary mixing zone;

(d) pausing a second predetermined time interval to allow the second salt solution to enter a predetermined distance into the gelatin solution; and (e) repeating steps (a) through (d).

2. The process of claim 1 wherein the first and second time intervals are substantially equal.

3. The process of claim 1 further comprising the step of:

(f) drawing into the primary mixing zone gelatin solution containing the reaction product of the silver salt and the halide salt solutions from the secondary mixing zone defined within the vessel.

4. The process of claim 3 wherein the first and second time intervals are substantially equal.

5. The process of claim 3 wherein the predetermined point lies beneath the mixing member.

6. The process of claim 5 wherein the first and second time intervals are substantially equal.

7. The process of claim 1 wherein the predetermined point lies beneath the mixing member.

8. The process of claim 7 wherein the first and second time intervals are substantially equal.

* * * * *